(12) United States Patent
Cezary

(10) Patent No.: US 7,419,046 B2
(45) Date of Patent: Sep. 2, 2008

(54) METHOD AND DEVICE FOR WASHING CONVEYOR BELTS

(75) Inventor: Majewski Cezary, Jedlnia (PL)

(73) Assignee: International Tobacco Machinery Poland Ltd., Radom (PL)

( * ) Notice: Subject to any disclaimer, the term of this patent is extended or adjusted under 35 U.S.C. 154(b) by 0 days.

(21) Appl. No.: 11/708,996

(22) Filed: Feb. 21, 2007

(65) Prior Publication Data

US 2007/0193603 A1 Aug. 23, 2007

(30) Foreign Application Priority Data

Feb. 22, 2006 (PL) .................................... 379034

(51) Int. Cl.
*B65G 45/00* (2006.01)
(52) U.S. Cl. ........................ 198/495; 198/496
(58) Field of Classification Search .............. 198/493, 198/494, 495, 496, 497, 498, 499
See application file for complete search history.

(56) References Cited

U.S. PATENT DOCUMENTS

| | | | | |
|---|---|---|---|---|
| 3,815,728 A * | 6/1974 | Vaughan | .................... | 198/495 |
| 3,896,924 A * | 7/1975 | Sbarra | .................... | 198/494 |
| 4,176,601 A * | 12/1979 | Szarka | .................... | 101/115 |
| 4,494,647 A * | 1/1985 | Davis | .................... | 198/494 |
| 4,860,833 A * | 8/1989 | Barnes et al. | .................... | 172/26 |
| 4,860,883 A * | 8/1989 | Knaul et al. | .................... | 198/495 |
| 4,960,200 A * | 10/1990 | Pierce | .................... | 198/495 |
| 5,058,728 A * | 10/1991 | Leiweke et al. | .................... | 198/495 |
| 5,355,992 A * | 10/1994 | Baig et al. | .................... | 198/495 |
| 5,368,650 A * | 11/1994 | Tanaka et al. | .................... | 134/15 |
| 5,542,525 A * | 8/1996 | Kornely | .................... | 198/495 |
| 5,613,594 A * | 3/1997 | Kootsouradis | .................... | 198/495 |
| 5,649,616 A * | 7/1997 | Stecklow | .................... | 198/496 |
| 5,779,024 A * | 7/1998 | Harper | .................... | 198/496 |
| 6,196,374 B1 * | 3/2001 | Kilgert et al. | .................... | 198/495 |
| 6,321,900 B1 * | 11/2001 | Micklethwaite | .................... | 198/498 |
| 6,971,503 B2 * | 12/2005 | Thompson | .................... | 198/494 |
| 6,983,510 B1 * | 1/2006 | Hudgins | .................... | 15/256.5 |
| 7,234,586 B1 * | 6/2007 | Newman | .................... | 198/495 |

* cited by examiner

*Primary Examiner*—James R Bidwell
(74) *Attorney, Agent, or Firm*—Marshall, Gerstein & Borun LLP

(57) ABSTRACT

A method for washing conveyor belts, according to the invention, is characterized in that the drive of the conveyor belt (2) is transferred via rollers (3) and a cleaning element is driven, preferably having the form of a rotating brush (9), and the shield (4) is sprayed by a spraying system (7), and the cleaning element is wetted by a wetting system (8).

A device for washing conveyor belts, comprising a cleaning element and spraying nozzles, is characterized in that the conveyor belt (2) is situated between a pressuring element and a washing-cleaning assembly (1).

20 Claims, 3 Drawing Sheets

METHOD AND DEVICE FOR WASHING CONVEYOR BELTS

This invention relates to a method and a device for washing conveyor belts in food industry, particularly in tobacco industry and relates to a washing process of any type of transporting belts mounted on conveyors.

A device is known from U.S. Pat. No. 4,860,883, in which a rotating cleaning element is used to wash a belt, having a form of a cylinder covered with a continuos cleaning layer, e.g., fleece, the task of which is to remove wetted dirt from the belt. As a consequence, the resistance of the material moving oppositely to the belt requires relatively high power for rotating the cylinder, the power being possible to provide only by a separate drive (for example an electrical drive). The advantage of this solution relative to the use of a brush is that there is no splash of a liquid inside the device, but due to its structure, the material is gradually and permanently filled up with the dirt, thus making the quality of the cleaning process being less and less effective with increasing the time of the operation of the roller, and also imposing the necessity of frequent exchange of the coat (the working surface) of the cylinder.

Such a cylinder is not suitable for cleaning belts with embossments on the working surface, which are often used in the industry, for example for conveyors arranged at a large inclination angle.

Moreover, it should be noted that in industrial practice the dirt has a form of a coating, often hardened, which may be strongly adhered to the working surface of the belt. Impurities accumulate particularly persistently in the proximity of hollows/embossments, or other patterns of the working surface of the belt, the depth/height of which is typically in the range of 0-5 mm. Thus, employing a rotating roller, especially with a flat working surface, does not make it possible to remove dirt from the belt's surface properly.

An additional effect in the cited document is the said necessity of wetting and/or spraying a liquid onto the working surface of the roller. This is disadvantageous, or even impractical for the industry, since impurities deposited in a smooth portion of the working belt need other amounts of the liquid than those deposited/accumulated in the proximity of hollows/embossments, or other patterns of the belt's working surface. In the case of applying an amount of the liquid being optimal for the removal of the dirt from a smooth portion of the belt, impurities deposited/accumulated in the proximity of hollows/embossments or other patterns of the belt's working surface will remain. In the case of applying an excess amount of the liquid, so that to remove dirt deposited/accumulated in the proximity of hollows/embossments, or other patterns of the belt's working surface, the cleaned belt's surface may remain wetted after leaving the device due to the continuos working motion of the belt. Linear scrapers remove the excess liquid and/or remaining dirt effectively only on smooth, non-profiled belts. In the case of profiled belts, which constitute a significant fraction in the industry, such scrapers are ineffective.

In this case impurities reaccumulate on the belt's working surface. The effect of this reaccumulation process is particularly strong and adverse at the moment when the wetted belt's working surface contacts the transported material again.

According to the invention, a method for washing conveyor belts, wherein a washing liquid is sprayed from spraying nozzles and the belt's working surface is cleaned by a cleaning element, is characterized in that the drive of the conveyor belt is transferred via rollers and the cleaning element is driven, preferably having the form of a rotating brush, and the shield is sprayed by a spraying system and the cleaning element is wetted by a wetting system.

Moreover, the conveyor belt is dried after the washing step.

Moreover, the dirt is sprayed with a stream of liquid from nozzles and is removed to lower portion of the washing-cleaning assembly, preferably to a sink basin.

The velocity of the belt is 5-60 m/min, preferably 10-40 m/min.

The belt is dried by an air knife with a pressure of air of 300-600 kPa, preferably at least 400 kPa.

The shield is sprayed with a washing liquid of a pressure of 20-500 kPa, preferably 30-100 kPa, coming from a wetting system, and the cleaning element is wetted with a washing liquid of a pressure of 20-500 kPa, preferably 30-100 kPa, coming from the wetting system (8).

The rotational speed of the brush is 20-240 rpm, preferably the rotational speed is 1.2-3.2 times the linear velocity of the belt.

The pressure of the washing liquid from the nozzles for flushing the impurities is 100-500 kPa, preferably 300-400 kPa.

According to the invention, a device for washing conveyor belts, comprising a cleaning element and spraying nozzles, is characterized in that the conveyor belt is situated between a pressuring element and a washing-cleaning assembly.

The washing-cleaning assembly comprises a cleaning element situated between rollers, which are situated directly below the conveyor belt, and it is equipped with a spraying system for spraying the shield and a wetting system for wetting the cleaning element.

The washing-cleaning assembly is movably mounted to a support plate and is coupled to the support plate via a drive, preferably a pneumatic cylinder.

Preferably, the cleaning element is a rotating brush seated on a brush roller.

Preferably, rollers are connected by an endless belt, which is pressured by a roller from above, and a stretching roller is situated below the brush roller for controlling the tension of the endless belt.

The pressuring element comprises at least one pressuring roller, which is a rotary roller.

Preferably, nozzles for flushing the impurities are located in the lower portion of the washing-cleaning assembly, and, preferably, a sink basin is located below them, in the lower portion of the washing-cleaning assembly.

Moreover, the washing-cleaning assembly comprises at least one air knife for drying the conveyor belt from remaining film of the washing liquid, situated transversely at an angle, directly below the conveyor belt. Preferably, the air knife has a form of a slit nozzle.

The disadvantages of the known solutions have been eliminated due to the use of a brush, according to the present invention.

According to the invention, a drying step has been introduced after the washing step.

In the case of simple substituting a rotating brush for the cylinder in the described device, without employing an assembly of rollers described in the present invention, the device would lose its self-cleaning functionality and would contribute to transferring the impurity onto other elements of the conveyor.

The device according to the invention does not need any separate driving assembly. The drive is transferred from the conveyor belt to the brush.

Due to the operation of the device, the brush is subjected to a self-cleaning process, this, preferably, allowing for obtaining constant parameters of the process of cleaning the belt, and also the necessity of cleaning and/or exchanging the cleaning brush is eliminated.

The rollers transferring the drive have also a function of tensioning and straightening the belt if it is mechanically deformed, and also function as a self-cleaning, splash-proof shield of the cleaning zone. Moreover, one of these rollers, mounted beyond the brush in the direction of the motion of the belt, is collecting an excess of the liquid therefrom. In order to guarantee the proper tension of the belt and the proper drive transfer, the belt is pressured by pressuring elements.

The invention will be now described with reference to a particular embodiment and accompanying drawings, in which.

Figure 1:
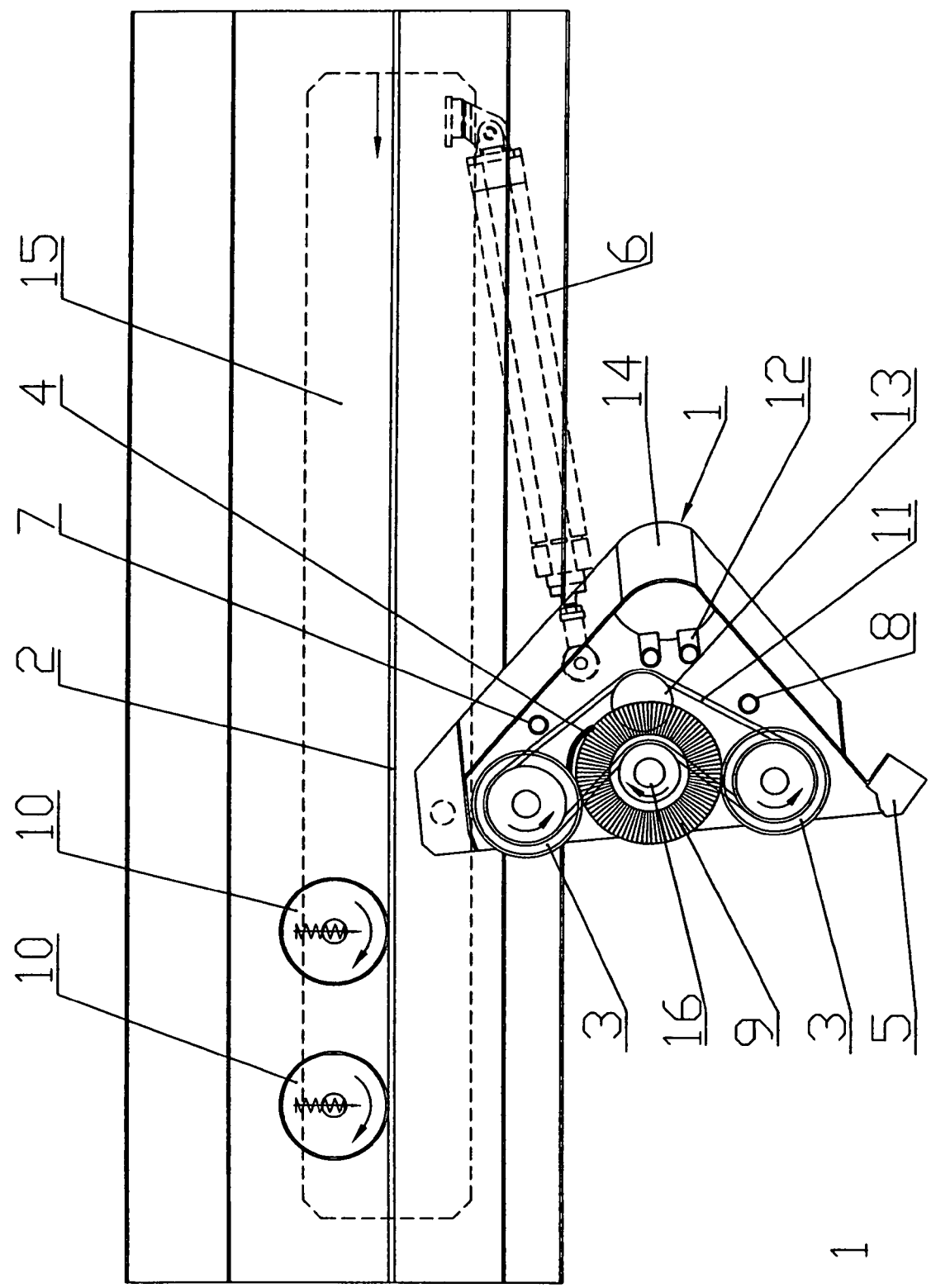
FIG. 1 shows schematically a side view of a device according to the invention in the rest position.

According to the invention, in a method of washing conveyor belts, one transfers the drive of the conveyor belt 2 via rollers 3 and drives a cleaning element, preferably in the form of a rotating brush 9. Also, one sprays a shield 4 by means of a spraying system 7 and wets the cleaning element by means of a wetting system 8. Moreover the belt 2 is dried after the washing step. Also, according to the invention one sprays the impurities with a stream of the liquid from nozzles 12 and removes them to the lower portion of the washing-cleaning assembly 1, preferably to the sink basin 14.

The velocity of the belt is 5-60 m/min, preferably 10-40 m/min, and the belt is dried by means of an air knife 5 with a pressure of 300-600 kPa, preferably at least 400 kPa.

The shield 4 is sprayed with a washing liquid with a pressure of 500 kpa, preferably 30-100 kPa, from a spraying system 7, and the cleaning element is wetted by the washing liquid with a pressure of 20-500 kPa, preferably 30-100 kPa, from the wetting system 8.

The rotating brush 9 has a rotational speed in the range of 20-240 rpm, preferably the rotational speed is 1.2-3.2 times the linear velocity of the belt 2.

The pressure of the washing liquid from the nozzles 12 for flushing the impurities is 100-500 kPa, preferably 300-400 kPa.

Figure 2:
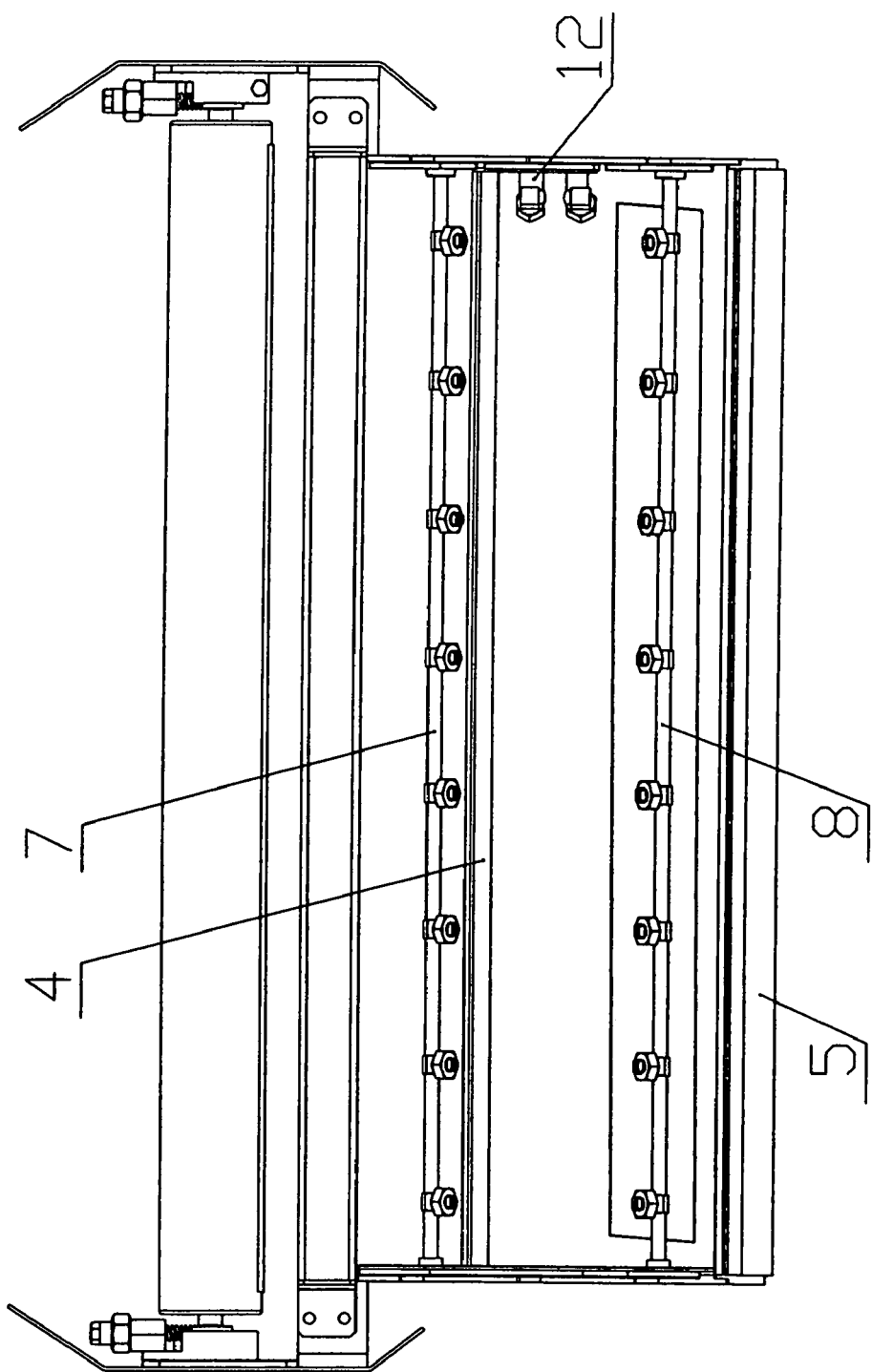
FIG. 2 shows schematically a front view of the device of FIG. 1.

FIGS. 1 and 2 show the rest position of the device for washing the conveyor belt 2. The device is mounted to a support plate 15, which is mounted to conveyors' frame (not shown in the figure).

Figure 3:
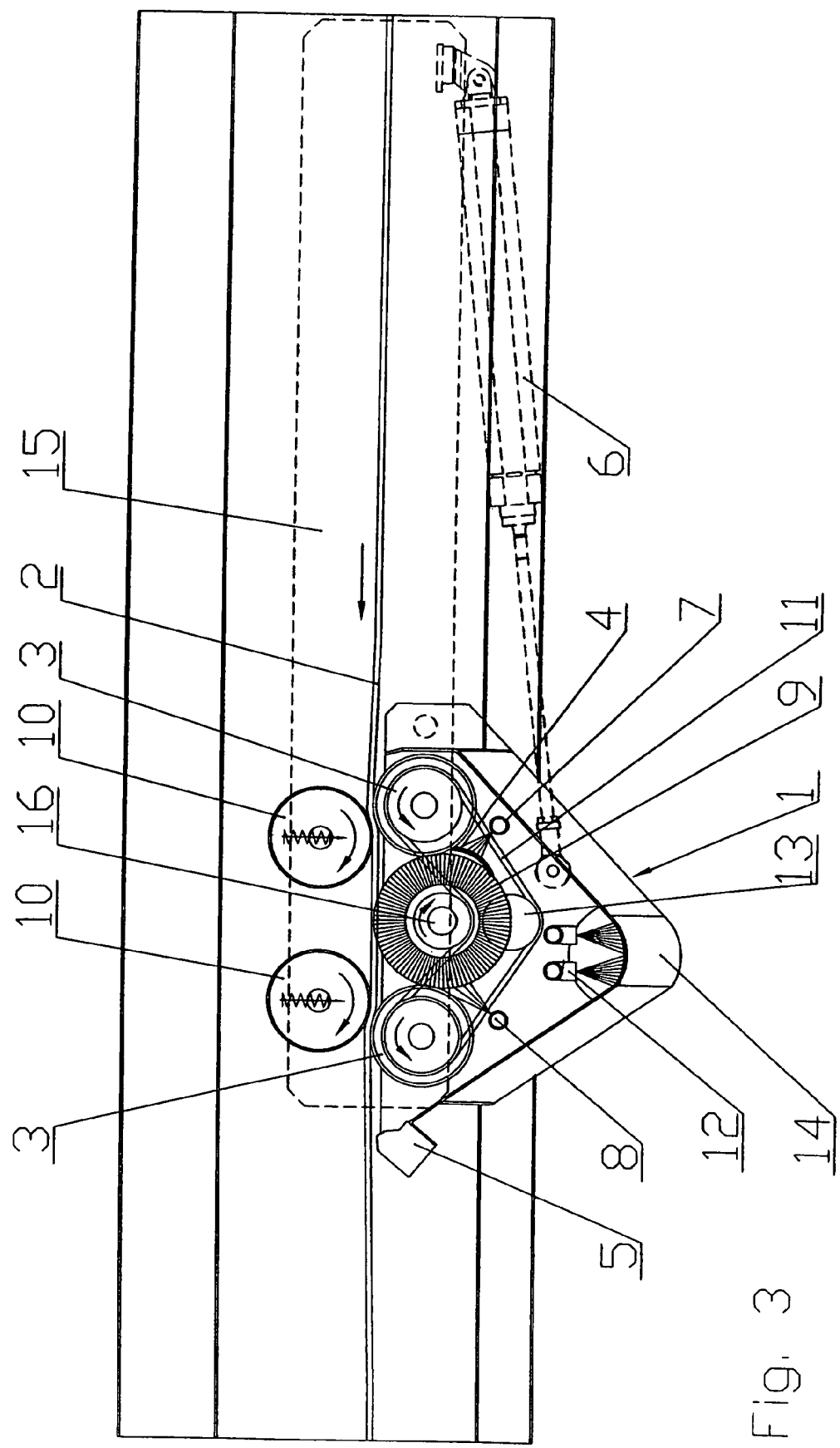
FIG. 3 shows schematically a side view of a device according to the invention in the working position.

The device comprises a washing-cleaning assembly 1, movably mounted to the support plate 15, the assembly, after switching on, travelling upward by means of a drive, preferably a pneumatic cylinder 6, from the rest position shown in FIGS. 1 and 2 to the working position below the belt 2 of the conveyor, as shown in FIG. 3.

After the washing-cleaning assembly 1 enters the working position, the assembly is activated. The belt 2 drives the roller 3 and the pressuring element having the form of at least one pressuring roller 10, preferably two, afterward the drive being transferred to the cleaning element, preferably in the form of a rotating brush 9, via an endless belt 11 and a stretching roller 13, via a brush roller 16, on which the brush is mounted. The brush 9 is situated between the rollers 3. The stretching roller 13 is situated below the brush roller 16 with the rotating brush 9. The brush 9 has two functions: it cleans the belt 2 and the rollers 3. The endless belt 11 is pressured by the brush roller 16 from above, while the stretching roller 13 for controlling the tension of the endless belt 11 is situated below the brush roller 16. Best cleaning effects are obtained for the belt 2 travelling with a velocity of 5-60 m/min, preferably 10-40 m/min.

The washing-cleaning assembly 1 comprises at least one air knife 5 for drying the belt 2 from the remaining film of the washing liquid, the air knife being situated transversely at an angle directly below the belt 2. Preferably, the air knife 5 has a form of a slit nozzle.

Then, the wetting system 8 is activated for wetting the rotating brush 9 and the spraying system 7 is activated for spraying the shield 4 with a washing liquid, for example water and/or its solution. The shield 4 of the brush 9 has also a function of a scraper for the roller 3 and it is cleaned by the same brush 9.

The spraying system 7 feeding the process liquid via, e.g., water nozzles, is situated along the shield 4 and has a function of washing the shield 4, while the wetting system 8 comprises, e.g., water nozzles feeding the process liquid. The nozzles are arranged along the brush 9 and wet it along its whole length.

Impurities in a liquid form accumulate in the lower portion 14 of the cleaning-washing assembly 1 of the device for washing conveyor belts 2, then being removed therefrom by a liquid stream, for example the washing liquid from the nozzles 12, to the sink basin 14 or a container for sewage.

The invention claimed is:

1. A method for washing conveyor belts, wherein a washing liquid is sprayed from spraying nozzles onto a cleaning element and the belt has a working surface that is cleaned by the cleaning element, characterized in that the motion of the conveyor belt is transferred via rollers to the cleaning element, a shield is positioned with one edge against one of the rollers and is sprayed by a spraying system, and the cleaning element is wetted by a wetting system.

2. A method according to claim 1, characterized in that the conveyor belt is dried after being washed.

3. A method according to claim 1, characterized in that dirt is sprayed with a stream of liquid from nozzles and is removed to a lower portion of the washing-cleaning assembly.

4. A method according to claim 1, characterized in that the velocity of the belt is 5-60 m/min.

5. A method according to claim 1, characterized in that the belt is dried by an air knife with a pressure of air of 300-600 kPa.

6. A method according to claim 1, characterized in that the shield is sprayed with a washing liquid from the spraying system that has a pressure of 20-500 kPa, and the cleaning element is also wetted with that washing liquid.

7. A method according to claim 1, characterized in that the cleaning element is a brush that has a rotational speed of 20-240 rpm.

8. A method according to claim 3, characterized in that the pressure of the stream of liquid from the nozzles is 100-500 kPa.

9. A method according to claim 1, characterized in that the belt is dried by an air knife with a pressure of air of at least 400 kPa.

10. A method according to claim 1, characterized in that the cleaning element moves at a speed 1.2-3.2 times the linear velocity of the belt.

11. A device for washing conveyor belts that has:
   a pressuring element that mounts on a first side of the conveyor belt; and
   a washing-cleaning assembly that mounts on a second side of the conveyor belt and has:
      a cleaning element that cleans the second side of the conveyor belt;

a pair of rollers that are positioned on opposite sides of the cleaning element and transfer motion from the conveyor belt to the cleaning element; and spraying nozzles that spray liquid that is used to clean the cleaning element and at least one of the rollers.

12. A device according to claim 11, characterized in that the washing-cleaning assembly comprises a cleaning element situated between rollers that are situated directly below the conveyor belt, and the washing-cleaning assembly is equipped with a spraying system for spraying a shield and a wetting system for wetting the cleaning element.

13. A device according to claim 11, characterized in that the washing-cleaning assembly is movably mounted to a support plate.

14. A device according to claim 11, characterized in that the washing-cleaning assembly is mounted to a support plate via a pneumatic cylinder.

15. A device according to claim 12, characterized in that the cleaning element is a rotating brush seated on a brush roller.

16. A device according to claim 12, characterized in that the rollers are connected by an endless belt, which is pressured by a brush roller from above, and a tensioning roller is situated below the brush roller and controls the tension of the endless belt.

17. A device according to claim 11, characterized in that the pressuring element comprises at least one pressuring roller, which is a rotary roller.

18. A device according to claim 11, characterized in that nozzles are located in a lower portion of the washing-cleaning assembly, and a sink basin is located below them, in the lower portion of the washing-cleaning assembly.

19. A device according to claim 11, characterized in that the washing-cleaning assembly comprises at least one air knife that dries washing liquid from the conveyor belt, the air knife being situated transversely at an angle, directly below the conveyor belt.

20. A device according to claim 19, characterized in that the air knife has a form of a slit nozzle.

\* \* \* \* \*